(12) United States Patent
Hardiman et al.

(10) Patent No.: US 10,688,392 B1
(45) Date of Patent: Jun. 23, 2020

(54) REUSABLE VIDEO GAME CAMERA RIG FRAMEWORK

(71) Applicant: Amazon Technologies, Inc., Seattle, WA (US)

(72) Inventors: Jeremy Hardiman, Kenmore, WA (US); Christopher Roby, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 66 days.

(21) Appl. No.: 15/275,048

(22) Filed: Sep. 23, 2016

(51) Int. Cl.
*A63F 13/5258* (2014.01)
*A63F 13/5252* (2014.01)
*A63F 13/803* (2014.01)
*A63F 13/35* (2014.01)

(52) U.S. Cl.
CPC .......... *A63F 13/5258* (2014.09); *A63F 13/35* (2014.09); *A63F 13/5252* (2014.09); *A63F 13/803* (2014.09); *A63F 2300/8017* (2013.01)

(58) Field of Classification Search
CPC .... A63F 13/525; A63F 13/5258; A63F 13/60; A63F 13/35; A63F 13/5252; A63F 13/803; A63F 2300/8017
USPC ......................................................... 463/31
See application file for complete search history.

(56) References Cited

U.S. PATENT DOCUMENTS

| | | | |
|---|---|---|---|
| 7,148,892 B2 * | 12/2006 | Robertson ........... | G06F 3/04815 345/427 |
| 7,470,195 B1 * | 12/2008 | Baldwin, III ......... | A63F 13/10 463/33 |
| 8,026,913 B2 * | 9/2011 | Garbow ................. | A63F 13/10 345/419 |
| 8,514,255 B2 * | 8/2013 | Kami ..................... | A63F 13/52 345/679 |
| 9,345,972 B2 * | 5/2016 | Nishida ................. | A63F 13/803 |
| 9,789,401 B2 * | 10/2017 | Harada .................. | A63F 13/56 |
| 9,873,048 B2 * | 1/2018 | Yoshioka .............. | A63F 13/525 |
| 2004/0219980 A1 * | 11/2004 | Bassett .................. | A63F 13/10 463/33 |

(Continued)

OTHER PUBLICATIONS

Unity. Cameras—Unity Official Tutorials [online]. Apr. 8, 2013 [retrieved Oct. 11, 2019]. Retrieved from the Internet< URL: https://www.youtube.com/watch?v=xvyrzwwU1DE>. (Year: 2013).*

(Continued)

*Primary Examiner* — Allen Chan
(74) *Attorney, Agent, or Firm* — BakerHostetler

(57) ABSTRACT

A reusable video game camera rig framework is described herein. The framework may include instruction sets for controlling a virtual camera rig, which is used to set a position and orientation of a virtual camera within a virtual area of a video game. The instruction sets may be reusable in a variety of different camera contexts, such as a first person camera, a third person camera, a top-down camera, and many others. The instruction sets may also be reusable in a variety of different video game contexts, such as combat games, sports games, fantasy games, racing games, and many others. The instruction sets may be both modifiable and extendible to different camera and game contexts, for example allowing developers to easily generate new camera behaviors for their games and also to modify existing available camera behaviors to better match their particular camera and game contexts.

20 Claims, 9 Drawing Sheets

(56) References Cited

U.S. PATENT DOCUMENTS

| | | | | |
|---|---|---|---|---|
| 2009/0070093 A1* | 3/2009 | Nakanishi | ............... | A63F 13/00 703/22 |
| 2009/0237518 A1* | 9/2009 | Cheng | .................... | A63F 13/10 348/211.99 |
| 2009/0256837 A1* | 10/2009 | Deb | .................... | G06T 19/003 345/419 |
| 2010/0060661 A1* | 3/2010 | Avent | .................... | A63F 13/10 345/619 |
| 2011/0124385 A1* | 5/2011 | Otomo | .................... | A63F 13/10 463/3 |
| 2011/0304617 A1* | 12/2011 | Nishida | ................. | A63F 13/803 345/419 |
| 2014/0113718 A1* | 4/2014 | Norman | .................. | A63F 13/12 463/31 |
| 2017/0106285 A1* | 4/2017 | Odagiri | ................. | A63F 13/525 |
| 2017/0113138 A1* | 4/2017 | Makino | ............... | A63F 13/5258 |
| 2017/0368460 A1* | 12/2017 | Ceraldi | .................... | A63F 13/42 |
| 2017/0368461 A1* | 12/2017 | Ceraldi | ............... | A63F 13/5258 |
| 2018/0077345 A1* | 3/2018 | Yee | .................... | H04N 5/23222 |

OTHER PUBLICATIONS

Unity. Unity 5.2 Documentation Scripting API Classes Camera [online]. 2015 [retrieved on Oct. 11, 2019]. Retrieved from the Internet: < URL: https://docs.unity3d.com/520/Documentation/ScriptReference/Camera.html>. (Year: 2015).*

Unity. Unity 5.2 Documentation Unity Overview Creating Scenes [online]. 2015 [retrieved on Oct. 11, 2019]. Retrieved from the Internet<URL: https://docs.unity3d.com/520/Documentation/Manual/CreatingScenes.html>. (Year: 2015).*

Unity. Unity 5.2 Documentation Unity Overview Cameras Reference [online]. 2015 [retrieved on Oct. 11, 2019]. Retrieved from the Internet<URL: https://docs.unity3d.com/520/Documentation/Manual/class-Camera.html>. (Year: 2015).*

* cited by examiner

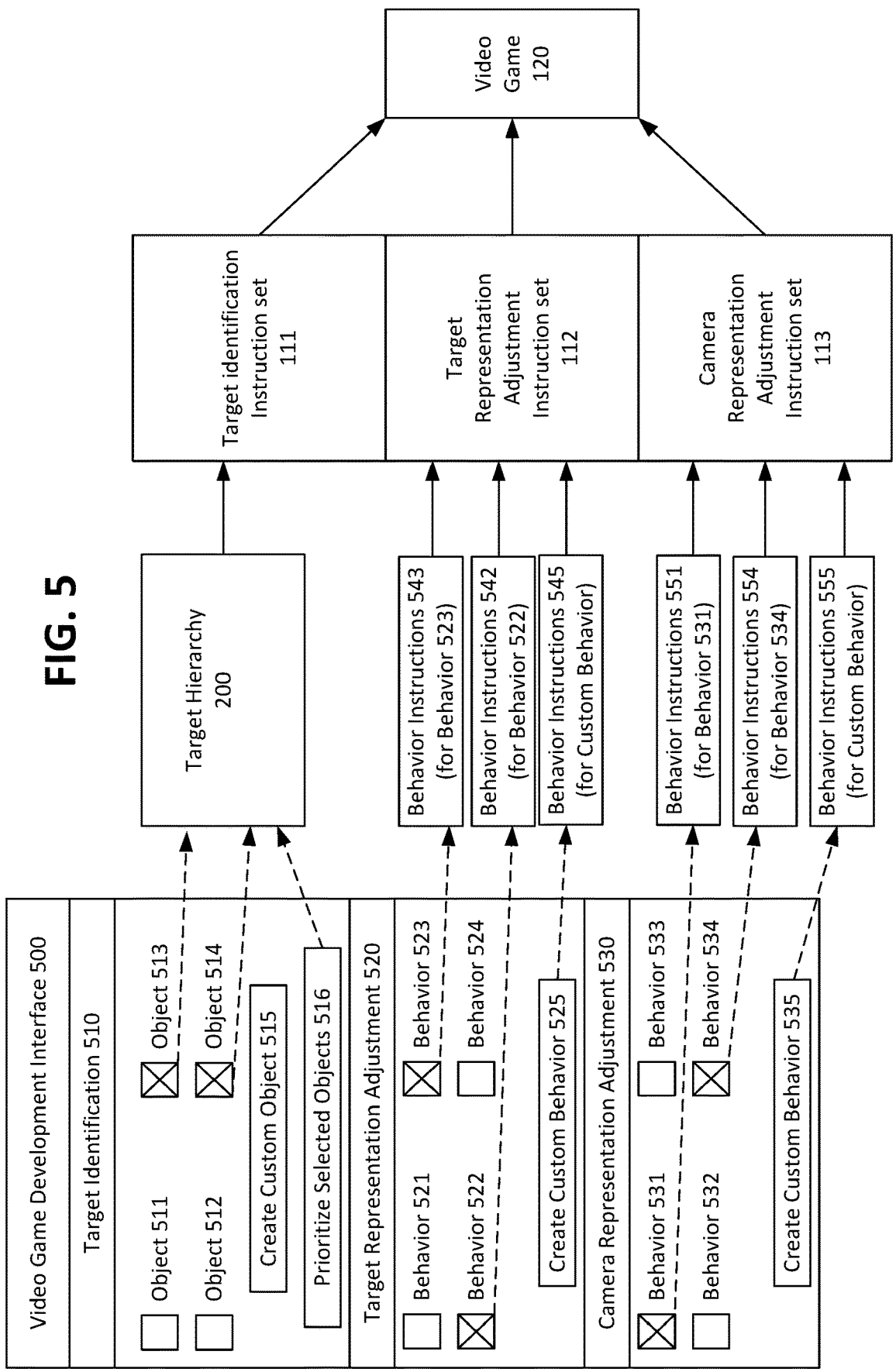

REUSABLE VIDEO GAME CAMERA RIG FRAMEWORK

BACKGROUND

One feature that is common across different video games is the use of a virtual camera that is employed to set a view frustum for perspective rendering of a particular portion of a virtual area of a game. Many video games may employ different types of cameras that behave differently from one another. For example, a first person camera may sometimes be employed to capture a view of a virtual area from a perspective of a particular character or object, such as a view from the perspective of the eyes of a character operated by a player. As another example, a third person camera may sometimes be employed to capture a view of a virtual area that is focused on one or more particular characters or objects within the virtual area. As yet another example, a top-down camera may be employed to capture a view of virtual area from a raised vertical position (e.g., from the sky). In some examples, a camera may switch between these and other view perspectives throughout the course of a single game. Furthermore, in addition to these different types of view perspectives, cameras may behave differently for types of games (e.g., combat, sports, fantasy, car racing, etc.) and for different types of events within the same games. One drawback associated with current video game development techniques is that camera functionality is often hard-coded directly into a particular type of camera for a particular video game. For example, a video game may have a first person camera with hard-coded embedded functionality and a separate third person camera with separate hard-coded embedded functionality. This embedding of functionality directly into the camera may not allow camera functionality to be reused between different types of games or even between different types of cameras in the same game. This may force game developers to independently re-create camera functionality, thereby reducing efficiency, increasing game development times and costs, and potentially leading to errors, flaws and lack of reliability in camera operation.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 is a diagram illustrating an example camera rig configuration system that may be used in accordance with the present disclosure.

DETAILED DESCRIPTION

Figure 1:
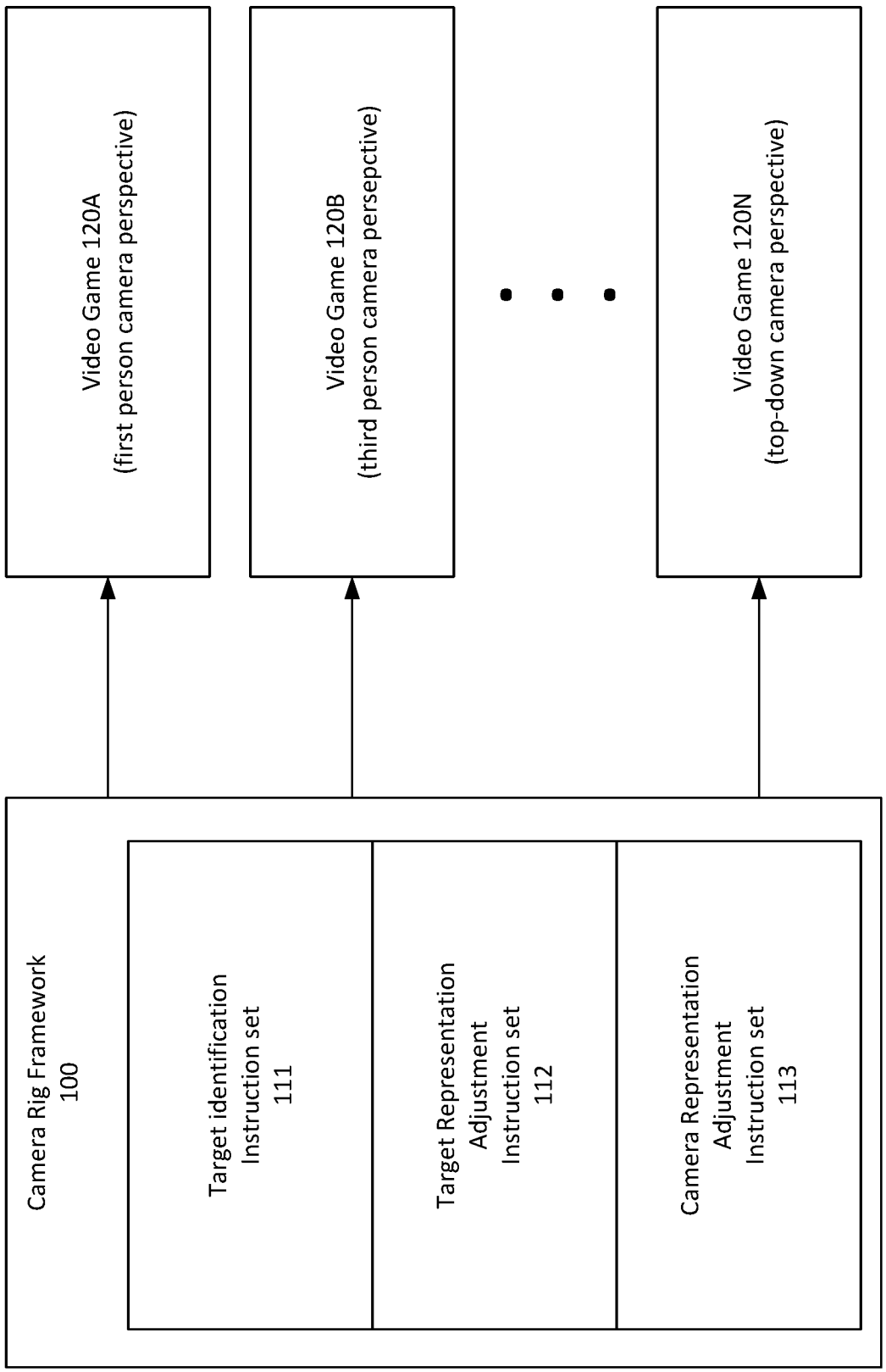
FIG. 1 is a diagram illustrating an example camera rig framework that may be used in accordance with the present disclosure.

A reusable video game camera rig framework is described herein. The framework may include instruction sets for controlling a virtual camera rig, which is used to set a position and orientation of a virtual camera within a virtual area of a video game. In some examples, the framework may be reusable in a variety of different camera contexts, such as a first person camera, a third person camera, a top-down camera, and many others. Also, in some examples, the framework may be reusable in a variety of different video game contexts, such as combat games, sports games, fantasy games, racing games, and many others. In some cases, by allowing reuse of the framework in different camera and game contexts, game development efficiency may be improved, development times and costs may be reduced, and in-camera operation may be performed more reliably and effectively. The instruction sets may be both modifiable and extendible to different camera and game contexts, for example allowing developers to easily generate new camera behaviors for their games and also to modify existing available camera behaviors to better match their particular camera and game contexts.

In some examples, the camera rig framework may include three instruction sets: a target identification instruction set, a target representation adjustment instruction set, and a camera representation adjustment instruction set. In particular, the target identification instruction set may include instructions for identifying one or more targets within a virtual area of a video game. A target may include, for example, one or more objects, portions of objects, or locations, within a virtual area, based, at least in part, upon which a camera may be positioned and/or oriented. In some examples, the target identification instruction set may include indications of a plurality of selected targets and a hierarchy that prioritizes the selected targets relative to one another. The target identification instruction set may also include instructions for determining an original target representation based, at least in part, on the one or more identified targets. A target representation may include a representation (e.g., point, location, orientation, etc.), which is associated with one or more targets, relative to which the camera may be rotated, extended, and/or otherwise manipulated. For example, for a car racing game, a target may sometimes be identified as a particular race car, and a target representation may sometimes be selected as a particular point, location, and/or orientation on the target race car.

The target representation adjustment instruction set may include instructions for adjusting the target representation, such as by rotating and/or moving the target representation. The target representation adjustment instruction set may include one or more selected target representation adjustment behaviors. As an example, in some cases, a selected target representation adjustment behavior may result in rotating a camera around a target race car while the target race car remains stationary. In some cases, such a behavior may be achieved by rotating the target representation, which may, in turn, cause the camera to rotate around the target race car. In some examples, each selected target representation adjustment behavior may include one or more respective conditions that trigger performance of the target representation adjustment behavior as well as respective instructions for implementing the target representation adjustment behavior.

The camera representation adjustment instruction set may include instructions for adjusting a camera representation, for example relative to the target representation. The camera representation adjustment instruction set may include one or more selected camera representation adjustment behaviors. As an example, in some cases, a selected camera representation adjustment behavior may result in the camera following a target race car from a particular distance and/or angle. In some cases, such a behavior may be achieved by providing instructions for the camera representation to extend from the target representation at the particular distance and/or angle. In some examples, each selected camera representation adjustment behavior may include one or more respective conditions that trigger performance of the camera representation adjustment behavior as well as respective instructions for implementing the camera representation adjustment behavior.

In some examples, the camera rig instruction sets may be generated using a video game development interface that exposes available targets and behaviors. Game developers may use such an interface to select available targets and to generate a hierarchy that prioritizes the selected targets relative to one another. Game developers may also use the interface to select available behaviors that are desired for their video games, such as target representation adjustment behaviors and camera representation adjustment behaviors. In some examples, upon selection of available behaviors via the development interface, pre-generated modifiable instructions for implementing the selected behaviors may be inserted into the resulting video game. Also, in some examples, the development interface may allow selected behaviors to be easily modified for particular camera and game contexts. The development interface may also allow new behaviors to be easily and efficiently generated by game developers to match particular camera and game contexts.

In some examples, an executing video game may implement the camera rig instruction sets using a repeatable implementation algorithm, such as may be repeatedly implemented on a frame-by-frame or other periodic basis. In particular, in some examples, the algorithm may include identifying, within the virtual area of the video game, one or more targets based, at least in part, on a traversal of at least part of a hierarchy of targets included in the target identification instruction set. An original target representation may then be determined based, at least in part, on the one or more targets. It may then be determined that one or more conditions associated with at least a first target representation adjustment behavior are satisfied. The original target representation may then be adjusted to a final target representation based, at least in part, on instructions associated with the first target representation adjustment behavior. It may then be determined that one or more conditions associated with a first camera representation adjustment behavior are satisfied. An original camera representation may then be adjusted to a final target representation based, at least in part, on the final target representation and on instructions associated with the first camera representation adjustment behavior. A position and an orientation of a virtual camera may then be set based, at least in part, on the final camera representation.

FIG. 1 is a diagram illustrating an example camera rig framework that may be used in accordance with the present disclosure. In particular, in the example of FIG. 1, camera rig framework 100 includes a target identification instruction set 111, a target representation adjustment instruction set 112, and a camera representation adjustment instruction set 113. As will be described in greater detail below, target identification instruction set 111 may generally include instructions for identifying one or more targets within a virtual area of a video game. The target identification instruction set may also include instructions for determining an original target representation based, at least in part, on the one or more identified targets. Target representation adjustment instruction set 112 may generally include instructions for adjusting the target representation, for example based on various target representation adjustment behaviors as described in detail below. Camera representation adjustment instruction set 113 may generally include instructions for adjusting a camera representation, for example based on various camera representation adjustment behaviors as described in detail below.

As also shown in FIG. 1, camera rig framework 100 may be employed and reused for controlling a camera in video games 120A-N. In the particular example of FIG. 1, video game 120A employs a first person camera perspective, video game 120B employs a third person camera perspective, and video game 120N employs a top-down camera perspective. It is noted, however, that camera rig framework 100 may be employed for any number of different video games employing any combination of these or other camera perspectives. It is further noted that camera rig framework 100 may be employed for a variety of different video game contexts, such as combat games, sports games, fantasy games, car and other racing games, and many others. As will be described in detail below, instruction sets 111, 112 and 113 may be both modifiable and extendible to different camera and game contexts, for example allowing developers to easily generate new camera behaviors for their games and also to modify existing available camera behaviors to better match their particular camera and game contexts.

Some example features of target identification instruction set 111 will now be described in detail. In particular, in some examples, target identification instruction set 111 may include indications of a plurality of selected targets. A target may include, for example, one or more objects, portions of objects, or locations, within a virtual area, based, at least in part, upon which a camera may be positioned and/or oriented. For example, for a car racing game, targets may include one or more cars within the game, such as cars crossing the finish line, cars on fire, a car passing another car, a car in first place, a car operated by a particular player, and many others. For a combat game, a target may include one or more characters within the game, such as a character operated by a particular player, characters on a particular team, characters in combat, characters being killed, characters at a particular site or location, and many others. Many other types of targets may be selected for any number of the above or other types of different video game contexts.

Figure 2:
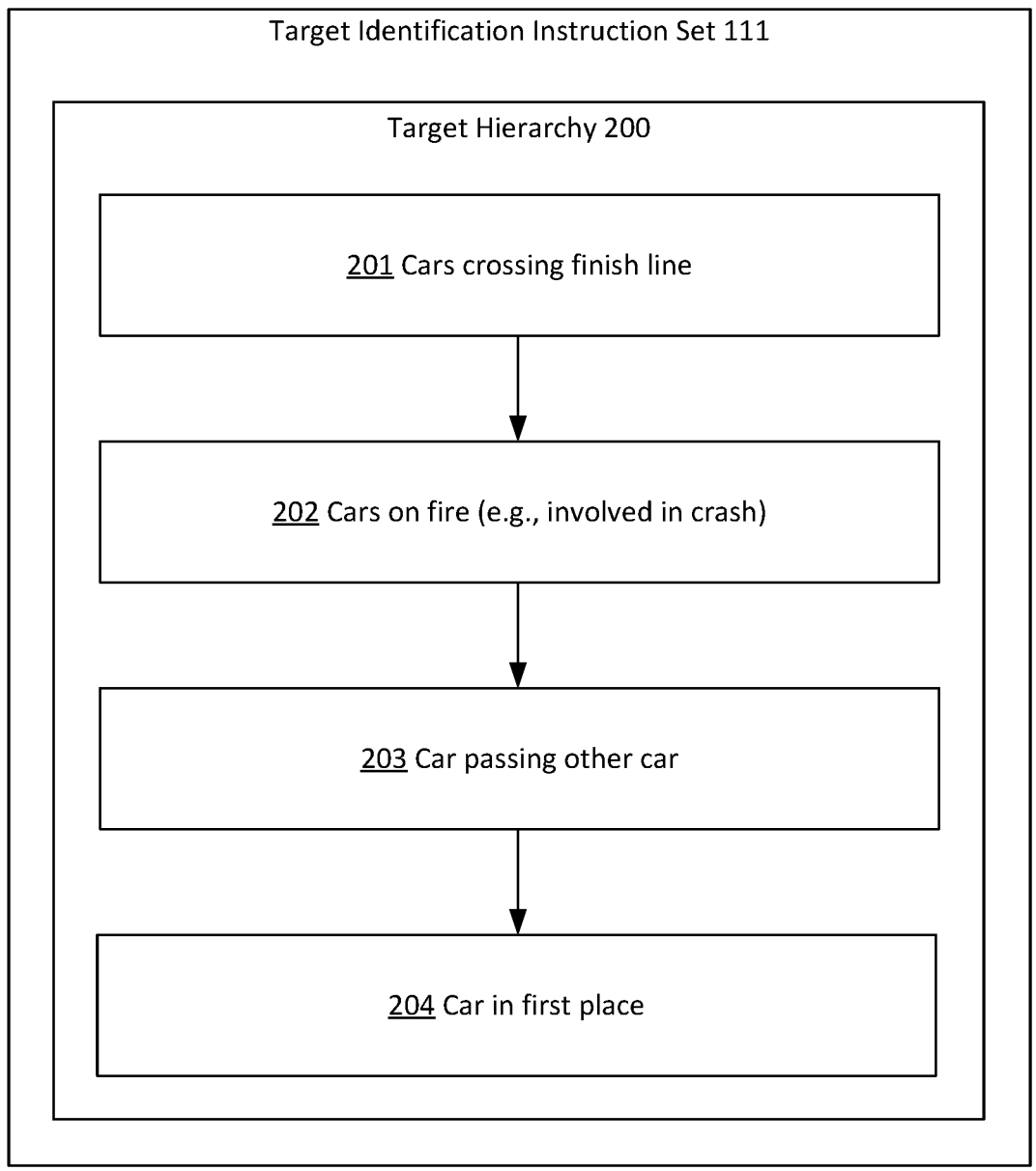
FIG. 2 is diagram illustrating an example target hierarchy that may be used in accordance with the present disclosure.

The target identification instruction set 111 may include a hierarchy that prioritizes the selected targets relative to one another. Referring now to FIG. 2, an example target hierarchy 200 for a car racing game will now be described in detail. In the example of FIG. 2, target hierarchy 200 includes a highest priority target node 201 (cars crossing the finish line), a second highest priority target node 202 (cars on fire), third highest priority target node 203 (car passing other car), and a fourth highest priority target node 204 (car in first place). In some examples, a video game may traverse a target hierarchy, starting by considering a highest priority target node and subsequently considering each next highest priority target node, until one or more targets associated with a target node have been identified within a virtual area of the video game. For example, a car racing video game may traverse target hierarchy 200 by first considering highest priority node 201, which may include determining whether any car is currently crossing the finish line. If so, then that car may be selected as the identified target and traversal of the target hierarchy 200 may stop at node 201. If not, then the video game may proceed to consider second highest priority target node 202 by determining whether any cars are currently on fire (e.g., involved in a crash). If so, then those cars may be selected as the identified targets and traversal of the target hierarchy 200 may stop at node 202. If not, then the video game may proceed to consider third highest priority target node 203 by determining whether any car is currently passing another car. If so, then that car may be selected as the identified target and traversal of the target hierarchy 200 may stop at node 203. If not, then the video game may proceed to consider fourth highest priority target node 204 by determining which car is currently in first place. The first place car may then be selected as the identified target and traversal of the target hierarchy 200 may stop at node 204.

In some examples, target identification instruction set 111 may include instructions for identifying one or more targets for each frame generated during the course of the video game or on another periodic basis, such as a selected quantity of frames, in response to particular events, or based on other factors. It is noted however, that it may not be necessary to traverse a target hierarchy for each frame or for every time that a target is identified. For example, in some cases, for video game contexts in which identified targets are not expected to change frequently, it may only be necessary to traverse the target hierarchy a single time or on another less frequent basis (e.g., every one thousand frames, every twenty seconds, etc.). In some examples, for frames in which the target hierarchy is not re-traversed, it may only be necessary to update the position and/or orientation of a previously identified target (as opposed to identifying a new target).

In some examples, a target hierarchy may include tags or other identifiers for various targets included within the hierarchy, and these tags may match tags that are used by the video game to identify respective objects within the video game itself. For example, node 202 of target hierarchy 200 may include a FIRE tag that is used by a respective video game to identify cars that are on fire within the video game. When the video game is considering node 202 to identify whether there are currently any cars on fire, the video game may simply attempt to match the FIRE tag in node 202 to a corresponding tag attached to one or more objects that currently exist within the video game's virtual area. If there are one or more matching tags, then thee objects associated with those tags may be identified as targets.

The target identification instruction set 111 may also include instructions for determining an original target representation based, at least in part, on the one or more identified targets. A target representation may include a representation (e.g., point, location, orientation, etc.), which is associated with one or more targets, relative to which the camera may be rotated, extended, and/or otherwise manipulated. For example, for a car racing game, a target may sometimes be identified as a particular race car, and a target representation may sometimes be selected as a particular point, location, and/or orientation on the target race car (e.g., a center point or geometric origin of the race car).

In some examples, target identification instruction set 111 may also include instructions for determining the original target representation when multiple targets have been identified for a given frame. For example, in some cases, when multiple targets are identified, the original target representation may sometimes be selected as an average (e.g., center point or mid-point) location between the multiple targets. In other examples, the targets may be weighted relative to one another, and the original target representation may be selected as a weighted average location between the multiple targets. Any combination of these or many other additional factors may be employed to determine an original target representation for multiple identified targets.

Figure 3:
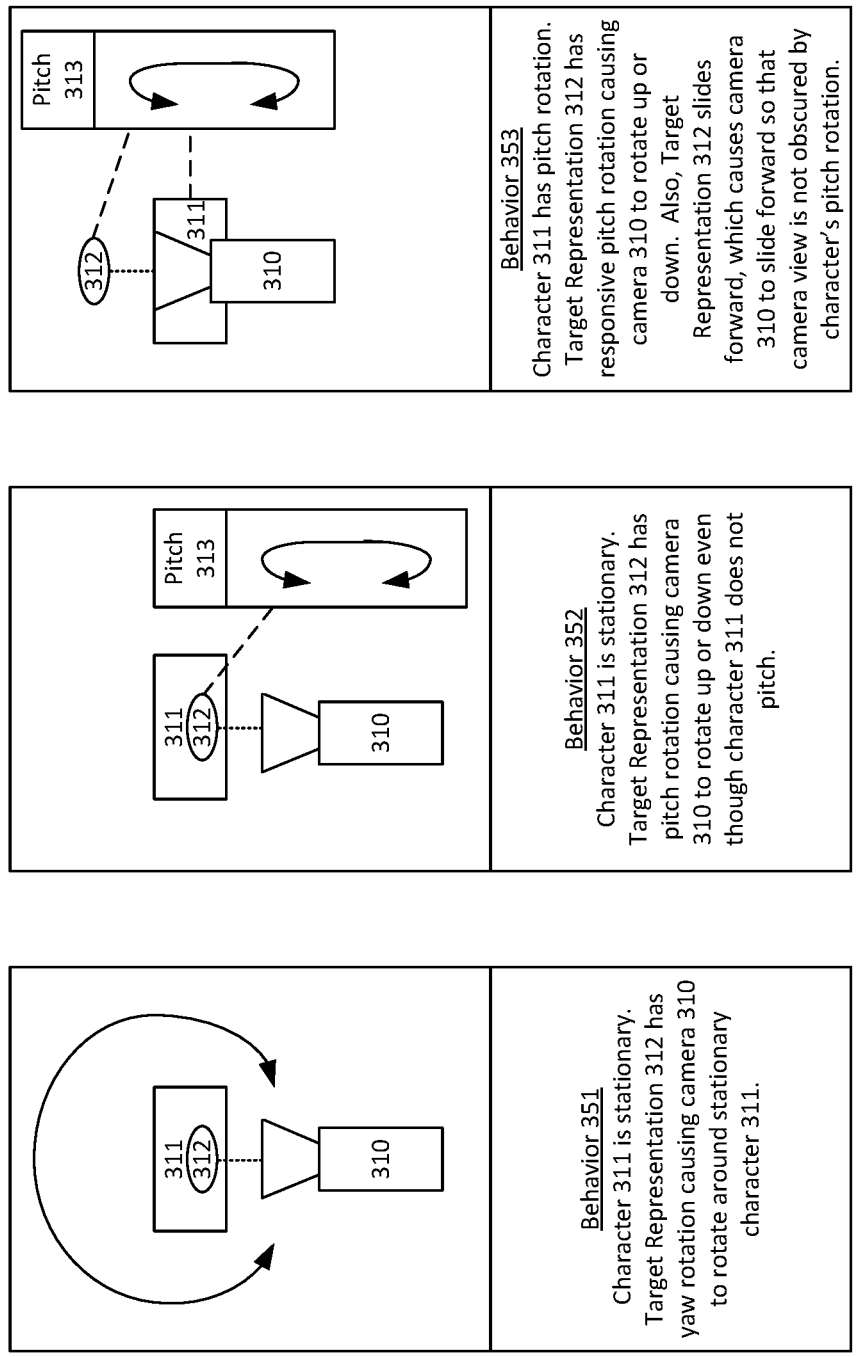
FIG. 3 is a diagram illustrating example target representation adjustment behaviors that may be used in accordance with the present disclosure.

Some example features of target representation adjustment instruction set 112 will now be described in detail. As set forth above, the target representation adjustment instruction set 112 may include instructions for adjusting the target representation, for example by rotating and/or moving (e.g., offsetting) the target representation. In particular, the target representation adjustment instruction set 112 may include one or more selected target representation adjustment behaviors. Referring now to FIG. 3, some example target representation adjustment behaviors 351-353 will now be described in detail. Example behaviors 351-353 relate to a third-person camera perspective in which a character 311 is identified as a target and a target representation 312 is then determined based on the character 311. Additionally, a camera 310 follows the character 311 at a specified distance from the target representation 312. As shown in FIG. 3, in example behavior 351, character 311 remains stationary (i.e., does not move). However, target representation 312 is adjusted by performing a yaw rotation to the target representation 312 (e.g., in a clockwise or counterclockwise manner). The yaw rotation of the target representation 312 causes camera 310 to responsively rotate around the stationary character 311. Behavior 351 may be advantageous, for example, by allowing a player to view character 311 from various different perspectives, such as to view injuries or damage sustained by the character 311 or for many other reasons.

In example behavior 352, character 311 again remains stationary (i.e., does not move). However, in this example, target representation 312 is adjusted by pitching the target representation 312 (as indicated by the pitch directional arrow 313). Pitching of the target representation 312 causes camera 310 to responsively rotate up or down. Behavior 352 may be advantageous, for example, by allowing a player to rotate the camera view up or down in scenarios when a character 311 does not (or cannot) pitch up or down.

In example behavior 353, character 311 has a pitch rotation. The pitch rotation of character 311, in turn, causes target representation 312 to responsively have a pitch rotation. Additionally, the pitch rotation of target representation 312, in turn, causes camera 310 to responsively rotate up or down. However, in this example, target representation 312 is adjusted by sliding the target representation 312 forward to a location in front of character 311. The forward movement of target representation 312, in turn, causes camera 310 to responsively slide forward towards the front of character 311. Behavior 353 may be advantageous, for example, because, in certain third-person camera scenarios, an up or down pitch of a target character may tend to cause the target character to substantially block or obstruct the camera view. By sliding the camera 310 forward towards the front of the character 311, the camera 310 is able to rotate up or down while simultaneously reducing an extent to which the pitch of the character 311 blocks or obstructs the camera view.

It is noted that behaviors 351-353 are merely intended as non-limiting descriptive examples of certain target representation adjustment behaviors. It is noted that any combination of these or other target representation adjustment behaviors may be selected and employed in accordance with the camera rig framework described herein. It is also noted that, in addition to behaviors themselves, target representation adjustment instruction set 112 may also include respective instructions for implementing each behavior as well as one or more respective conditions for triggering each behavior. For example, in some cases, behavior 351 may be triggered by holding down a particular button (e.g., a X button) on a controller and moving a directional control left or right depending on the desired direction of rotation of the camera 310. As another example, in some cases, behavior 352 may be triggered by holding down a particular button (e.g., a Y button) on a controller and moving a directional control up or down depending on the desired direction of rotation of the camera 310. As yet another example, in some cases, behavior 353 may be triggered by pitch rotation of character 311.

Some example features of camera representation adjustment instruction set 113 will now be described in detail. As set forth above, the camera representation adjustment instruction set 113 may include instructions for adjusting the camera representation, for example relative to the target representation. In particular, the camera representation adjustment instruction set 113 may include one or more selected camera representation adjustment behaviors. In some examples, a selected camera representation adjustment behavior may include following a target representation form a particular distance and/or angle, limiting a camera representation to particular amount of acceleration or movement, and/or many other different behaviors.

Figure 4A:
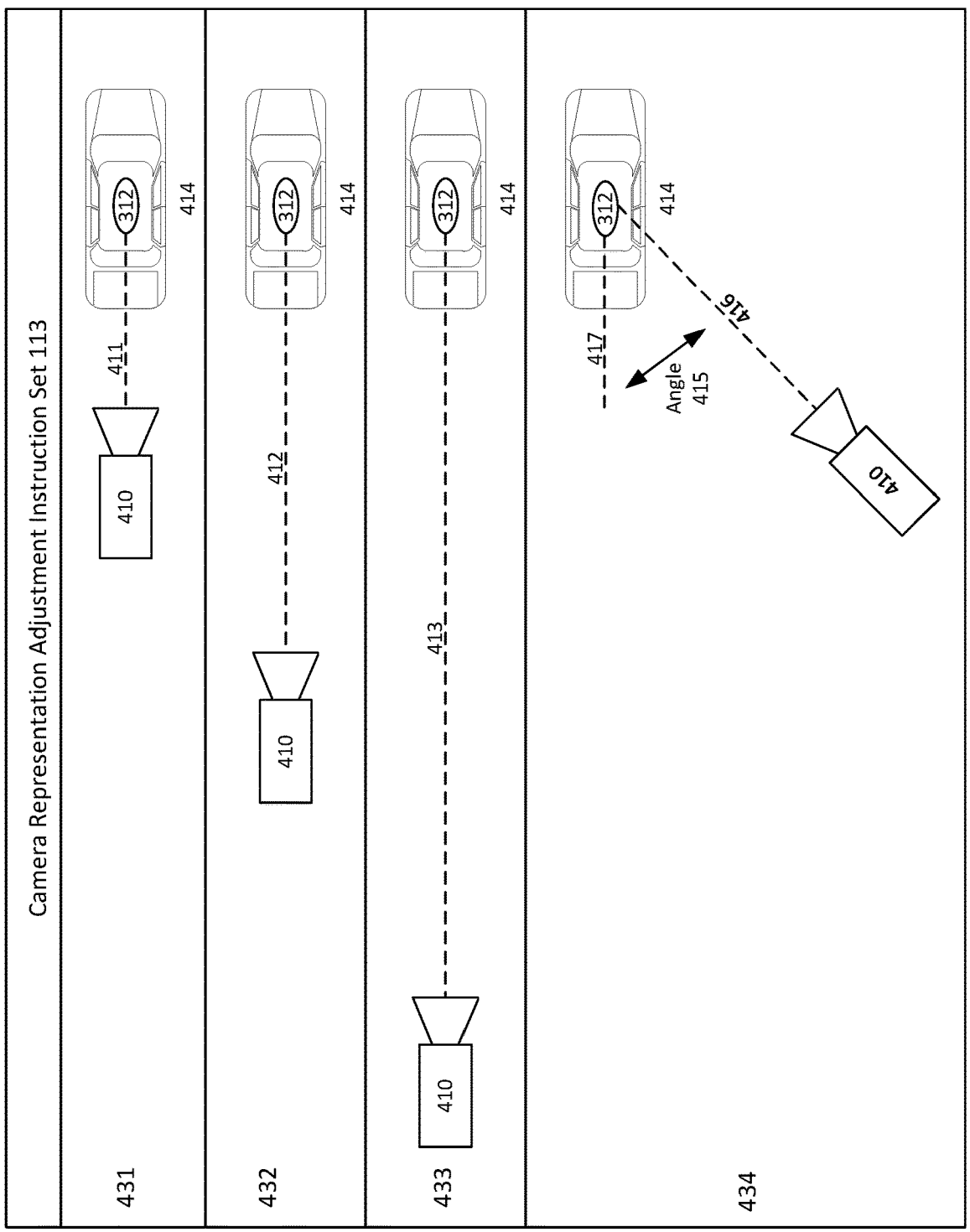
FIG. 4A is a diagram illustrating example camera representation adjustment behaviors that may be used in accordance with the present disclosure.

Referring now to FIG. 4A, some example camera representation adjustment behaviors 431-434 will now be described in detail. Example behaviors 431-434 relate to a car racing game in which a car 414 is identified as a target and a target representation 312 is then determined based on the car 414. In particular, behaviors 431-433 illustrate different behaviors in which the camera representation 410 follows (e.g., is extended from) the target representation 312 by various different distances. Specifically, in behavior 431, the camera representation 410 follows the target representation 312 by a shorter distance 411. In behavior 432, the camera representation 410 follows the target representation 312 by an intermediate distance 412. In behavior 433, the camera representation 410 follows the target representation 312 by a longer distance 413. Behavior 434 illustrates an example in which camera representation 410 follows target representation 312 by a particular distance 416 and a particular angle 415 (e.g., between lines 416 and 417).

In addition to behaviors themselves, camera representation adjustment instruction set 113 may also include may also include respective instructions for implementing each behavior as well as one or more respective conditions for triggering each behavior. For example, in some cases, behaviors 431-434 may be triggered by different states or conditions associated with the target car 414. As an example, in some cases, when a car is driving straight, the camera representation may follow the target representation from a shorter distance and from a straight (i.e., zero degree) angle. By contrast, when a car is turning, the camera representation may follow the target representation from a longer distance and from a diagonal (i.e., non-zero degree) angle. In other examples, the distance and/or angle of the camera representation relative to the target representation may also vary based on other factors, such as the speed or of the car, a stage of game play, a performance (e.g., first place, last place) of the car, a setting (e.g., city, desert, forest, etc.), a location, a time of day, proximity of the car to other cars, a number of identified targets, and many other factors.

Figure 4B:
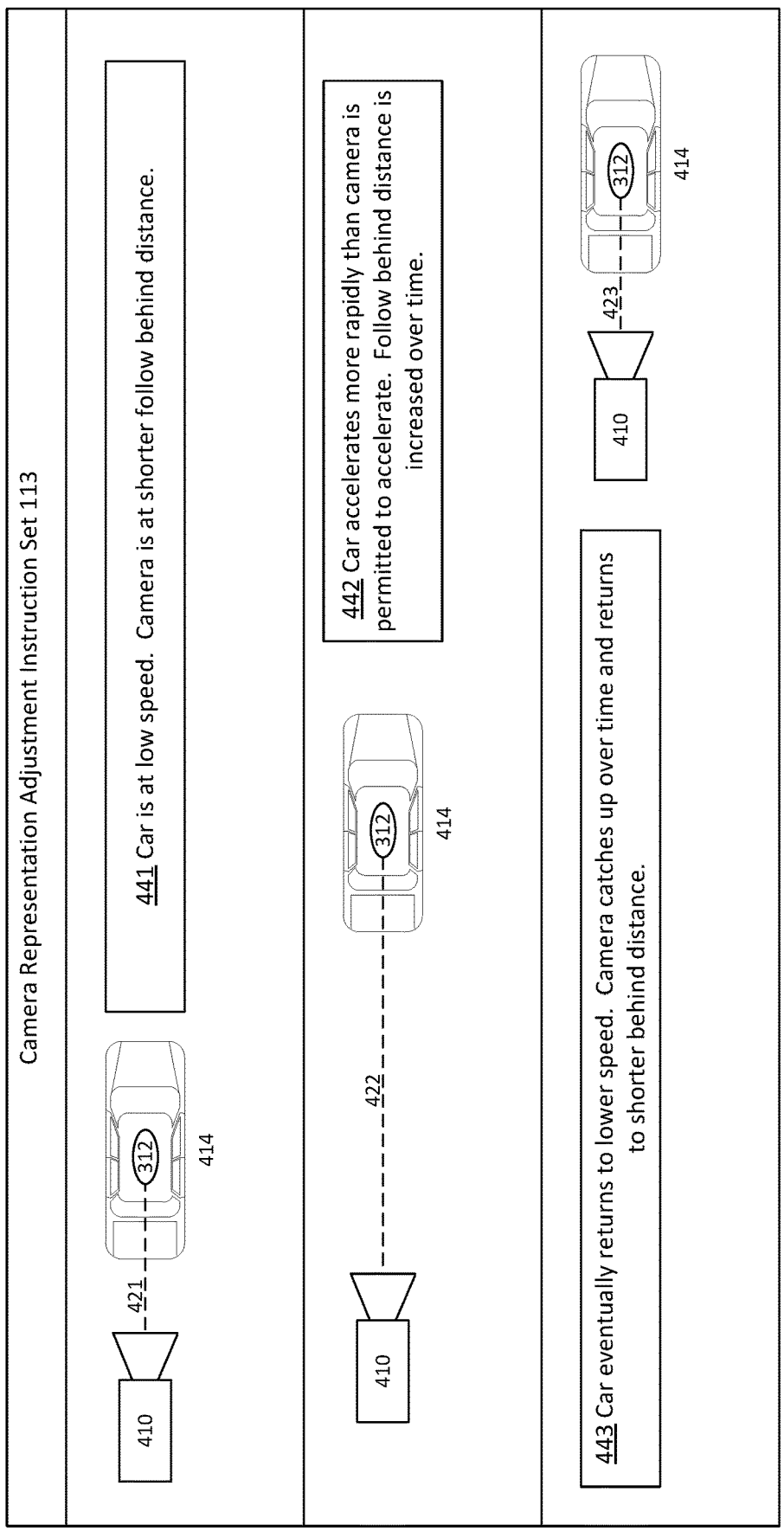
FIG. 4B is a diagram illustrating an example camera representation adjustment rule that may be used in accordance with the present disclosure.

In some examples, camera representation adjustment instruction set 113 may also include various restrictions, rules, or other instructions for regulating adjustment of the camera representation. For example, in some cases, camera representation adjustment instruction set 113 may include rules related to how quickly the camera representation is permitted to accelerate. Such rules may be advantageous, for example, by allowing the camera view to effectively provide an indication to a viewer of how quickly a target is moving, accelerating and/or decelerating. For example, in some cases, increasing the distance between the camera and the target may create an appearance that a target is accelerating, while decreasing the distance between the camera and the target may create an appearance that a car is decelerating or stabilizing its speed. Referring now to FIG. 4B, an example camera representation adjustment rule will now be described in detail. In particular, FIG. 4B illustrates an example rule that limits acceleration of a camera. As shown in FIG. 4B, at frame 441, car 414 is traveling at a lower speed, and camera representation 410 follows target representation 312 by a shorter follow behind distance 421. Subsequently, at frame 442, the car 414 accelerates more rapidly than the camera representation 410 is permitted to accelerate. As a result, camera representation 410 follows target representation 312 by an increased follow behind distance 422. It is noted that the follow behind distance may be increased over time as car 414 accelerates and that frame 442 is not necessarily a frame that immediately follows frame 441. Finally, at frame 443, the car 414 decelerates and returns to a lower speed. As a result, camera representation 410 catches up and returns to following target representation 312 by a shorter follow behind distance 423. It is noted that the follow behind distance may be decreased over time as car 414 decelerates and that frame 443 is not necessarily a frame that immediately follows frame 442. As set forth above, in some examples, by limiting the acceleration of the camera representation in this manner, the video game may effectively provide an indication to a viewer of how quickly a target is moving, accelerating and/or decelerating.

It is noted that FIGS. 4A and 4B are merely intended as non-limiting descriptive examples of certain camera representation adjustment behaviors and rules. It is noted that any combination of these or other camera representation adjustment behaviors and rules may be selected and employed in accordance with the camera rig framework described herein. For example, in some cases, a security camera behavior may be employed in which the camera representation remains at the same location but may rotate (e.g., pitch, yaw, etc.) to be pointing towards a target as it moves throughout a virtual area. As another example, a fly-by camera behavior may be employed in which the camera travels along a determined path, such as to mimic a camera that travels along a cable, is suspended from a plane, etc. Any combination of these or other camera representation behaviors and/or rules may be selected and employed.

Referring now to FIG. 5, an example camera rig configuration system will now be described in detail. In particular, in the example of FIG. 5, a video game development interface 500 is employed, for example by a video game developer, to configure operation of a camera rig for a video game 120. In some examples, video game development interface 500 may be exposed by a computing service provider that hosts execution of video game 120, such as via operation of one or more data centers or other computing services. Also, in some examples, any or all of the functionality described in relation to video game development interface 500 may be implemented via a software development kit (SDK), an application programming interface (API), or other interfaces or instructions, for example provided by the above described computing services provider or another party.

As shown in FIG. 5, video game development interface 500 includes a target identification section 510, a target representation adjustment section 520, and a camera representation adjustment section 530. In particular, target identification section 510 includes objects 511-514, which are objects that are made available by interface 500 and may be selected for inclusion in target hierarchy 200. For example, for car racing games, objects 511-514 may include objects such as cars crossing the finish line, cars on fire, cars in first place, and many others. Selection of one or more of objects 511-514 via interface 500 may cause the selected objects to be included in the target hierarchy 200 and, in turn, in target identification instruction set 111 and video game 120. In the example of FIG. 5, a user has selected objects 513 and 514 as indicated by the X symbol in the checkboxes adjacent to objects 513 and 514. In some examples, interface 500 may expose a tag or other identifier for each of objects 511-514, which may be inserted into the target hierarchy 200 upon selection of the object. In some examples, the exposed tag may be modifiable via interface 500, for example if the user wishes to modify the tag in order to match a respective tag used to identify a corresponding object in video game 120. Create custom object control 515 may allow a user to create custom objects for inclusion in target hierarchy 200 and to provide respective custom tags for the custom objects. Prioritize selected objects control 516 may allow users to prioritize selected objects within the target hierarchy 200. For example, with reference to nodes 201-204 of FIG. 2, a user may use control 516 to assign a highest priority to cars crossing the finish line, a second highest priority to cars on fire, a third highest priority to a car passing another car, and a fourth highest priority to a car in first place.

Target representation adjustment section 520 includes target representation adjustment behaviors 521-524, which are behaviors that are made available by interface 500 and may be selected for inclusion in target representation adjustment instruction set 112 and video game 120. For example, target representation adjustment behaviors 521-524 may include any or all of the example target representation adjustment behaviors 351-353 described above with reference to FIG. 3 or other target representation adjustment behaviors. Selection of one or more of behaviors 521-524 via interface 500 may cause instructions for implementing the selected behaviors to be included in the target representation adjustment instruction set 112 and video game 120. In the example of FIG. 5, a user has selected behaviors 522 and 523, which, in turn causes behavior instructions 542 (for behavior 522) and behavior instructions 543 (for behavior 523) to be inserted into target representation adjustment instruction set 112 and video game 120. In some examples, behavior instructions 542 and 543 may be pre-generated instructions that are exposed and provided by interface 500. Also, in some examples, any or all portions of instructions 542 and 543 may be modifiable via interface 500, for example to be better configured for particular camera and game contexts. Additionally, create custom behavior control 525 allows a user to generate custom target representation adjustment behaviors, for example for particular camera and game contexts. Selection of control 525 may also allow a user to generate, via interface 500, behavior instructions 545 for implementing a custom target representation adjustment behavior, and these instructions 545 may also be inserted into target representation adjustment instruction set 112 and video game 120.

Camera representation adjustment section 530 includes camera representation adjustment behaviors 531-534, which are behaviors that are made available by interface 500 and may be selected for inclusion in camera representation adjustment instruction set 113 and video game 120. For example, camera representation adjustment behaviors 531-534 may include any or all of the example camera representation adjustment behaviors 431-434 described above with reference to FIG. 4A or other camera representation adjustment behaviors. Selection of one or more of behaviors 531-534 via interface 500 may cause instructions for implementing the selected behaviors to be included in the camera representation adjustment instruction set 113 and video game 120. In the example of FIG. 5, a user has selected behaviors 531 and 534, which, in turn causes behavior instructions 551 (for behavior 531) and behavior instructions 554 (for behavior 534) to be inserted into camera representation adjustment instruction set 113 and video game 120. In some examples, behavior instructions 551 and 554 may be pre-generated instructions that are exposed and provided by interface 500. Also, in some examples, any or all portions of instructions 551 and 554 may be modifiable via interface 500, for example to be better configured for particular camera and game contexts. Additionally, create custom behavior control 535 allows a user to generate custom camera representation adjustment behaviors, for example for particular camera and game contexts. Selection of control 535 may also allow a user to generate, via interface 500, camera representation adjustment behavior instructions 555 for implementing a custom behavior, and these instructions 555 may also be inserted into camera representation adjustment instruction set 113 and video game 120.

Figure 6:
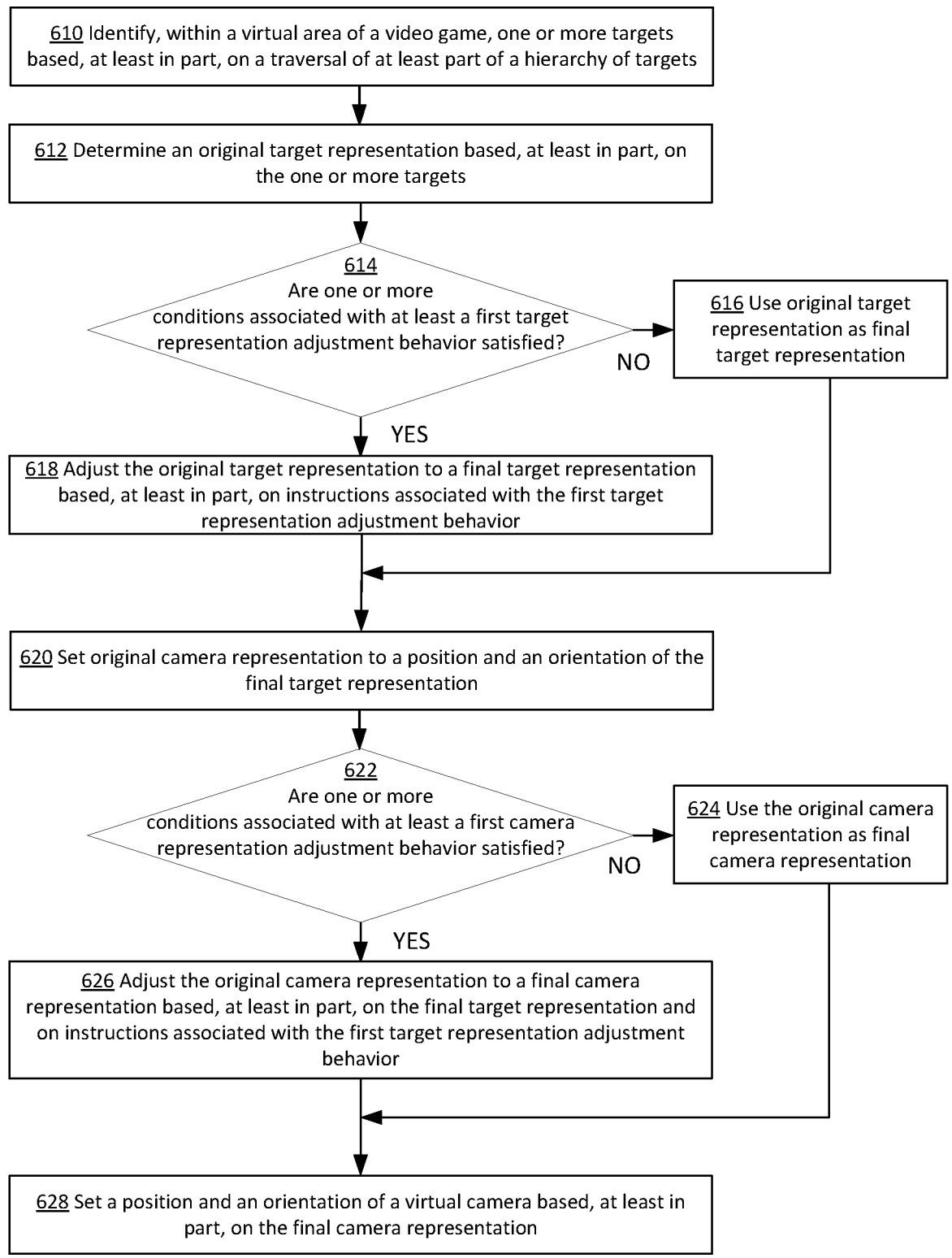
FIG. 6 is a flowchart illustrating an example process for controlling a virtual camera that may be used in accordance with the present disclosure.

Referring now to FIG. 6, an example process for controlling a virtual camera will now be described in detail. In some examples, the process depicted in FIG. 6 may be performed by an executing video game, for example on a frame-by-frame or other periodic basis. In particular, the process of FIG. 6 is initiated at operation 610, at which one or more targets are identified within a virtual area of a video game. As set forth above, a target may include, for example, one or more objects, portions of objects, or locations, within a virtual area, based, at least in part, upon which a camera may be positioned and/or oriented. The one or more targets are identified at operation 610 based, at least in part, on a traversal of at least part of a hierarchy of targets, such as example target hierarchy 200 of FIG. 2. For example, a hierarchy of targets may be traversed from a highest priority node to a lowest priority node until one or more targets associated with a node are identified within the virtual area of the video game. As also set forth above, the target hierarchy may be included in a target identification instruction set, for example that is generated using a video game development interface such as interface 500 of FIG. 5.

At operation 612, an original target representation is determined based, at least in part, on the one or more targets identified at operation 610. As set forth above, a target representation may include a representation (e.g., point, location, orientation, etc.), which is associated with one or more targets, relative to which the camera may be rotated, extended, and/or otherwise manipulated. In some examples, the original target representation may be set to a particular point (e.g., a center point or geometric origin), location, and/or orientation of an identified target. In some examples, when multiple targets are identified, the original target representation may sometimes be selected as an average (e.g., center point or mid-point) or weighted average location between the multiple targets. Any combination of these or other techniques may be employed to determine an original target representation.

At operation 614, it is determined whether one or more conditions associated with at least a first target representation adjustment behavior are satisfied. As set forth above, a target representation adjustment behavior may include, for example, a rotation and/or a movement of the target representation. Some example target representation adjustment behaviors, such as behaviors 351-353 of FIG. 3, are described in detail above and are not repeated here. As also set forth above, a video game development interface, such as interface 500 of FIG. 5, may expose various available target representation adjustment behaviors from which the first target representation adjustment behavior may be selected. Each of the available target representation adjustment behaviors may have a respective associated set of modifiable instructions for implementing the behavior, and selection of a behavior may cause its respective instructions to be provided by the video game development interface for inclusion in a video game. The video game development interface may also allow generation of custom target representation adjustment behaviors not included in the available behaviors exposed by the interface. The video game development interface may also allow a developer to indicate one or more conditions associated with each selected target representation adjustment behavior for triggering application of the associated behavior. These trigger conditions may also be included, for example via the interface, in the video game, and the video game may examine these associated conditions to determine whether one or more conditions are satisfied in order to trigger application of an associated behavior. Some example conditions may include, for example, various user inputs, selection of various controls, character movements, game states, object characteristics, locations, times, and other conditions. Some example conditions for triggering example behaviors 351-353 of FIG. 3, are described in detail above and are not repeated here.

If one or more conditions associated with at least a first target representation adjustment behavior are not satisfied (or if such conditions and/or behaviors do not exist within the context of the video game), then the process may proceed to operation 616, at which the original target representation is used as a final target representation. If, however, one or more conditions associated with at least a first target representation adjustment behavior are satisfied, then the process may proceed to operation 618, at which the original target representation is adjusted to a final target representation based, at least in part, on instructions associated with the first target representation adjustment behavior. For example, if the first target adjustment behavior includes a rotation and/or movement of the target representation, then the associated instructions may include instructions for rotating and/or moving the target representation in a specified rotation (e.g., pitch, yaw, roll, etc.) and/or direction, by a specified amount (e.g., degree, distance, etc.), and/or other instructions.

In some examples, at operation 614, conditions associated with triggering multiple target representation adjustment behaviors may be determined to be satisfied. In these examples, operation 618 may include iterating through each of the multiple target representation adjustment behaviors. For example, the original target representation may be adjusted to a first current target representation based instructions for the first target representation, and the first current target representation may then be adjusted to a second current target representation based on instructions for a second target representation adjustment behavior. The current target representation may continue to be adjusted for each successive target adjustment behavior until all triggered behaviors are applied and a final target representation is set.

At operation 620, an original camera representation is set to a position and an orientation of the final target representation. At operation 622, it is determined whether one or more conditions associated with at least a first camera representation adjustment behavior are satisfied. As set forth above, a camera representation adjustment behavior may include, for example, an adjustment to the original camera representation relative to the target representation by at least one of a distance or an angle. Some example camera representation adjustment behaviors, such as behaviors 431-434 of FIG. 4A, are described in detail above and are not repeated here. As also set forth above, a video game development interface, such as interface 500 of FIG. 5, may expose various available camera representation adjustment behaviors from which the first camera representation adjustment behavior may be selected. Each of the available camera representation adjustment behaviors may have a respective associated set of modifiable instructions for implementing the behavior, and selection of a behavior may cause its respective instructions to be provided by the video game development interface for inclusion in a video game. The video game development interface may also allow generation of custom camera representation adjustment behaviors not included in the available behaviors exposed by the interface. The video game development interface may also allow a developer to indicate one or more conditions associated with each selected camera representation adjustment behavior for triggering application of the associated behavior. These trigger conditions may also be included, for example via the interface, in the video game, and the video game may examine these associated conditions to determine whether one or more conditions are satisfied in order to trigger application of an associated behavior. Some example conditions may include, for example, various states or conditions (e.g., speed, orientation, direction, etc.) associated with one or more targets, a stage and/or state of game play, a performance (e.g., first place, last place) of a target, a setting (e.g., city, desert, forest, etc.), a location, a time of day, proximity of a target to other objects, a number of identified targets, and many other factors.

If one or more conditions associated with at least a first camera representation adjustment behavior are not satisfied (or if such conditions and/or behaviors do not exist within the context of the video game), then the process may proceed to operation 624, at which the original camera representation is used as a final camera representation. If, however, one or more conditions associated with at least a first camera representation adjustment behavior are satisfied, then the process may proceed to operation 626, at which the original camera representation is adjusted to a final camera representation based, at least in part, on the final target representation and on instructions associated with the first camera representation adjustment behavior. For example, if the first camera adjustment behavior includes an adjustment to the camera representation relative to the target representation, then the associated instructions may include instructions for extending the camera representation from the target representation by a specified distance and/or angle or otherwise manipulating the camera representation relative to the target representation.

Additionally, it is noted that, at least because the final target representation is used to set the position and the orientation of the original camera representation, the adjustment to the original target representation is also based, at least in part, on the final target representation. Moreover, in some cases, the final target representation may also be used to limit an amount (e.g., a distance or a degree of rotation) by which the final camera representation may be adjusted relative to the final target representation. For example, in some cases, target adjustment behavior instructions within the video game may include rules requiring that the final camera representation must remain within a specified distance, degree of rotation, or other orientation or position relative to the final target representation.

In some examples, at operation 622, conditions associated with triggering multiple camera representation adjustment behaviors may be determined to be satisfied. In these examples, operation 626 may include iterating through each of the multiple camera representation adjustment behaviors. For example, the original camera representation may be adjusted to a first current camera representation based instructions for the first camera representation, and the first current camera representation may then be adjusted to a second current camera representation based on instructions for a second camera representation adjustment behavior. The current camera representation may continue to be adjusted for each successive camera adjustment behavior until all triggered behaviors are applied and a final camera representation is set.

At operation 628, a position and an orientation of the virtual camera is set based, at least in part, on the final camera representation. Under typical circumstances, it is expected that operation 628 may include simply setting the virtual camera to have the same position and orientation as the final camera representation. In some cases, however, it may be potentially desirable to otherwise manipulate the position and orientation of the virtual camera, for example for certain game-specific reasons that are not described herein.

As also described above, in some examples, an interface may be provided that allows reception of information associated with a target identification instruction set, information associated with a target representation adjustment instruction set, and information associated with a camera representation adjustment instruction set. The target identification instruction set and/or information associated therewith may comprise a hierarchy of targets that is traversable to identify one or more targets within a virtual area of a video game. The target representation adjustment instruction set and/or information associated therewith may comprise at least a first target representation adjustment behavior for adjusting a target representation. The camera representation adjustment instruction set and/or information associated therewith may comprise at least a first camera representation adjustment behavior for adjusting a camera representation. The information associated with the target identification instruction set, the information associated with the target representation adjustment instruction set, and the information associated with the camera representation adjustment instruction set may be received via the interface. The target identification instruction set, the target representation adjustment instruction set, and the camera representation adjustment instruction set are insertable into, and may be inserted into, the video game to control a virtual camera in the virtual area of the video game.

Figure 7:
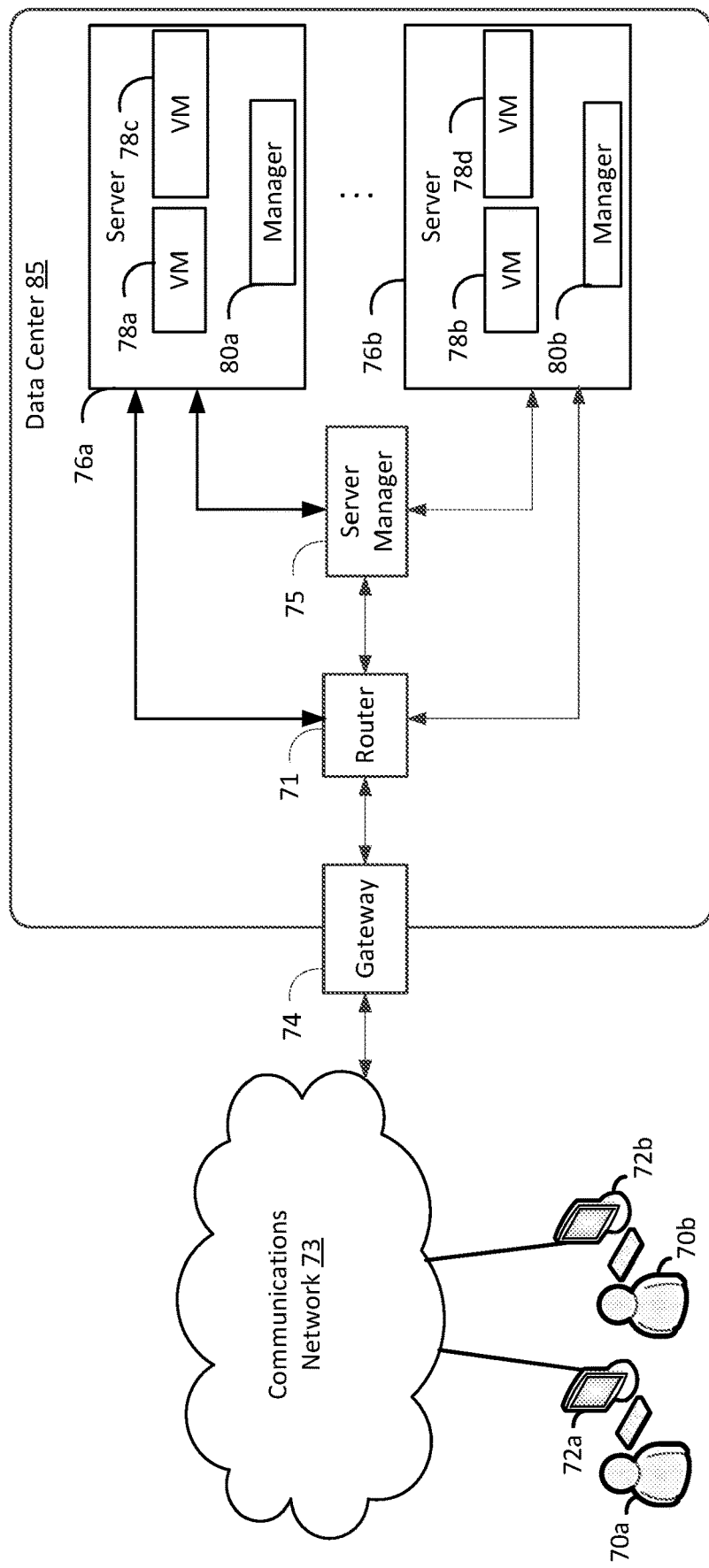
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
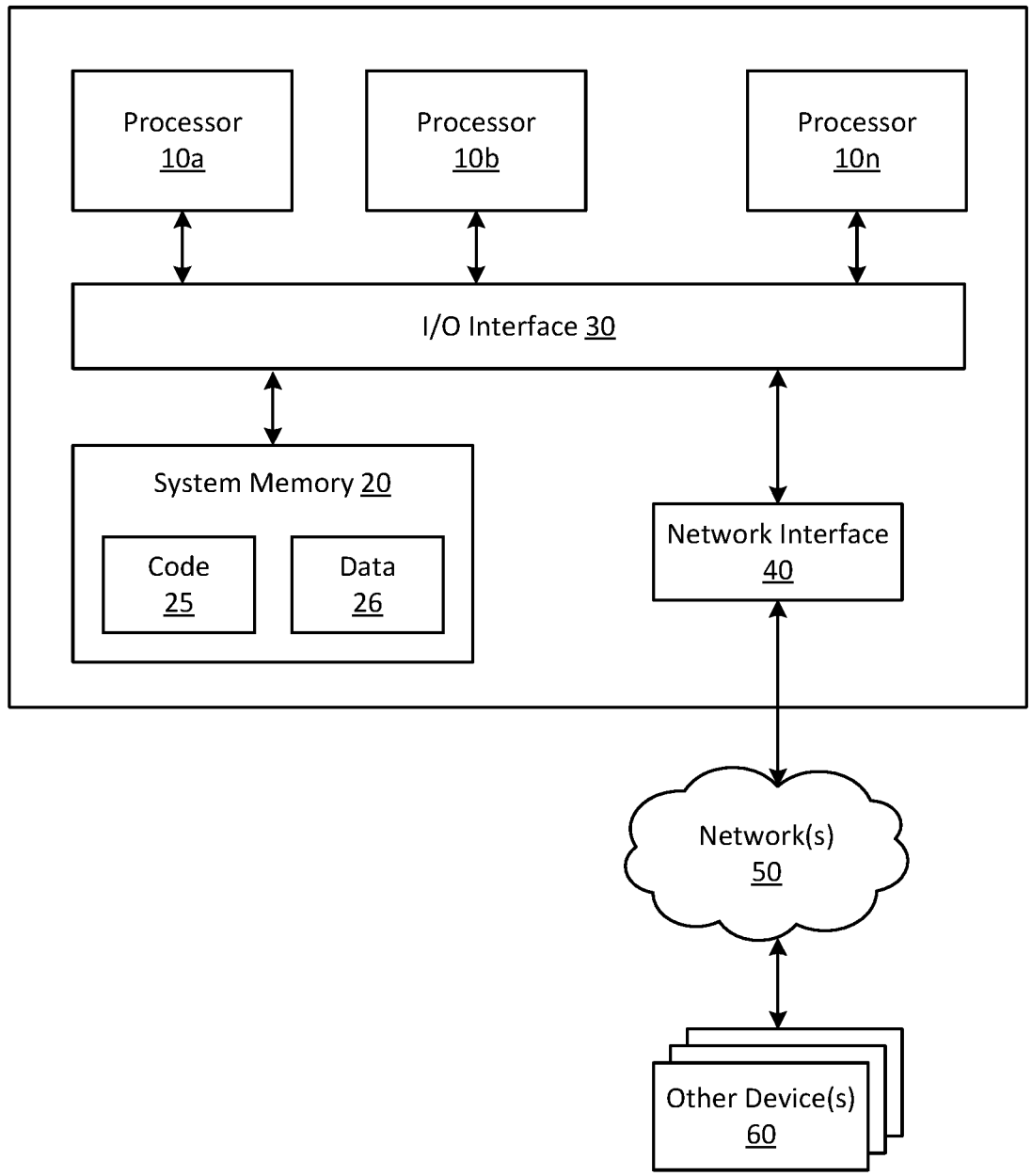
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus.

However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments.

Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   memory having stored therein processor-executable instructions that, upon execution by the one or more processors, cause the computing system to perform operations comprising:
      providing an interface that displays a first set of selectable identifiers, wherein the first set of selectable identifiers identifies a plurality of video game objects;
      receiving a first selection of a first identifier from the first set of selectable identifiers corresponding to a selected video game object of the plurality of video game objects;
      inserting the selected video game object into a hierarchy of targets including a plurality of nodes each associated with a corresponding video game object;
      traversing, by a video game, the hierarchy of targets from a highest priority node of the plurality of nodes towards a lowest priority node of the plurality of nodes until an identified video game object associated with one of the plurality of nodes is identified by the video game within a virtual area of the video game;
      determining that the identified video game object is a target of a virtual camera of the video game; and
      positioning the virtual camera relative to the target.

2. The computing system of claim 1, wherein the interface displays a second set of selectable identifiers that identify a plurality of target representation adjustment behaviors.

3. The computing system of claim 2, wherein the operations further comprise:
   receiving a second selection of a second identifier from the second set of selectable identifiers corresponding to a selected target representation adjustment behavior of the plurality of target representation adjustment behaviors; and
   inserting instructions for performing the selected target representation adjustment behavior in the video game to adjust a representation of the target.

4. The computing system of claim 3, wherein the interface displays a third set of selectable identifiers that identify a plurality of camera representation adjustment behaviors.

5. The computing system of claim 4, wherein the operations further comprise:
   receiving a third selection of a third identifier from the third set of selectable identifiers corresponding to a selected camera representation adjustment behavior of the plurality of camera representation adjustment behaviors; and
   inserting instructions for performing the selected camera representation adjustment behavior in the video game to adjust a camera representation relative to the representation of the target.

6. The computing system of claim 2, wherein the plurality of target representation adjustment behaviors comprise rotations of a representation of the target.

7. The computing system of claim 4, wherein the plurality of camera representation adjustment behaviors comprise adjusting a camera representation by at least one of an angle or a distance relative to the representation of the target.

8. A computer-implemented method comprising:
   providing an interface that displays a first set of selectable identifiers, wherein the first set of selectable identifiers identifies a plurality of video game objects;
   receiving a first selection of a first identifier from the first set of selectable identifiers corresponding to a selected video game object of the plurality of video game objects;
   inserting the selected video game object into a hierarchy of targets including a plurality of nodes each associated with a corresponding video game object;
   traversing, by a video game, the hierarchy of targets from a highest priority node of the plurality of nodes towards a lowest priority node of the plurality of nodes until an identified video game object associated with one of the plurality of nodes is identified by the video game within a virtual area of the video game;
   determining that the identified video game object is a target of a virtual camera of the video game; and
   positioning the virtual camera relative to the target.

9. The computer-implemented method of claim 8, wherein the interface displays a second set of selectable identifiers that identify a plurality of target representation adjustment behaviors.

10. The computer-implemented method of claim 9, further comprising:
    receiving a second selection of a second identifier from the second set of selectable identifiers corresponding to a selected target representation adjustment behavior of the plurality of target representation adjustment behaviors; and inserting instructions for performing the selected target representation adjustment behavior in the video game to adjust a representation of the target.

11. The computer-implemented method of claim 10, wherein the interface displays a third set of selectable identifiers that identify a plurality of camera representation adjustment behaviors.

12. The computer-implemented method of claim 11, further comprising:
receiving a third selection of a third identifier from the third set of selectable identifiers corresponding to a selected camera representation adjustment behavior of the plurality of camera representation adjustment behaviors; and
inserting instructions for performing the selected camera representation adjustment behavior in the video game to adjust a camera representation relative to the representation of the target.

13. The computer-implemented method of claim 9, wherein the plurality of target representation adjustment behaviors comprise rotations of a representation of the target.

14. The computer-implemented method of claim 11, wherein the plurality of camera representation adjustment behaviors comprise adjusting a camera representation by at least one of an angle or a distance relative to the representation of the target.

15. One or more non-transitory computer-readable storage media having stored thereon instructions that, upon execution by one or more computing devices, cause the one or more computing devices to perform operations comprising:
receiving a first selection of a first identifier from the first set of selectable identifiers corresponding to a selected video game object of the plurality of video game objects;
inserting the selected video game object into a hierarchy of targets including a plurality of nodes each associated with a corresponding video game object;
traversing, by a video game, the hierarchy of targets from a highest priority node of the plurality of nodes towards a lowest priority node of the plurality of nodes until an identified video game object associated with one of the plurality of nodes is identified by the video game within a virtual area of the video game;
determining that the identified video game object is a target of a virtual camera of the video game; and
positioning the virtual camera relative to the target.

16. The one or more non-transitory computer-readable storage media of claim 15, wherein the interface displays a second set of selectable identifiers that identify a plurality of target representation adjustment behaviors.

17. The one or more non-transitory computer-readable storage media of claim 16, wherein the operations further comprise:
receiving a second selection of a second identifier from the second set of selectable identifiers corresponding to a selected target representation adjustment behavior of the plurality of target representation adjustment behaviors; and
inserting instructions for performing the selected target representation adjustment behavior in the video game to adjust a representation of the target.

18. The one or more non-transitory computer-readable storage media of claim 17, wherein the interface displays a third set of selectable identifiers that identify a plurality of camera representation adjustment behaviors.

19. The one or more non-transitory computer-readable storage media of claim 18, wherein the operations further comprise:
receiving a third selection of a third identifier from the third set of selectable identifiers corresponding to a selected camera representation adjustment behavior of the plurality of camera representation adjustment behaviors; and
inserting instructions for performing the selected camera representation adjustment behavior in the video game to adjust a camera representation relative to the representation of the target.

20. The one or more non-transitory computer-readable storage media of claim 16, wherein the plurality of target representation adjustment behaviors comprise rotations of a representation of the target.

* * * * *